United States Patent
Herbst

(10) Patent No.: US 9,377,328 B2
(45) Date of Patent: Jun. 28, 2016

(54) VARIABLE RELUCTANCE SENSOR USING SPATIALLY MODULATED MAGNETIC FIELDS

(75) Inventor: Jan F. Herbst, Grosse Pointe Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 256 days.

(21) Appl. No.: 13/357,002

(22) Filed: Jan. 24, 2012

(65) Prior Publication Data

US 2013/0187638 A1   Jul. 25, 2013

(51) Int. Cl.
G01B 7/30   (2006.01)
G01B 7/14   (2006.01)
G01D 5/20   (2006.01)
G01P 3/488  (2006.01)

(52) U.S. Cl.
CPC .............. *G01D 5/202* (2013.01); *G01P 3/488* (2013.01)

(58) Field of Classification Search
CPC ........................................................ G01P 3/488
USPC .................................................. 324/207.15
See application file for complete search history.

(56) References Cited

U.S. PATENT DOCUMENTS

| | | | | |
|---|---|---|---|---|
| 4,700,133 A * | 10/1987 | Day | ........................ | 324/207.15 |
| 5,229,715 A * | 7/1993 | Niino et al. | ............... | 324/207.15 |
| 5,384,534 A * | 1/1995 | Bjork | ............................ | 324/160 |
| 5,574,361 A * | 11/1996 | Seefeldt et al. | ............... | 324/174 |
| 5,606,254 A * | 2/1997 | Xie et al. | ....................... | 324/174 |
| 6,229,298 B1 * | 5/2001 | Sakamoto et al. | ............ | 324/174 |
| 6,433,534 B1 * | 8/2002 | Spellman | ................. | 324/207.15 |
| 6,717,400 B2 * | 4/2004 | Ito et al. | .................... | 324/207.13 |
| 7,218,098 B2 * | 5/2007 | McCarrick et al. | ........... | 324/173 |
| 2003/0006760 A1 * | 1/2003 | Valles | ....................... | 324/207.15 |
| 2003/0155911 A1 * | 8/2003 | Kaste | ....................... | 324/207.26 |
| 2005/0083041 A1 * | 4/2005 | Schwartzbart | ........... | 324/207.17 |
| 2005/0127905 A1 * | 6/2005 | Proctor et al. | ........... | 324/207.15 |
| 2005/0150281 A1 * | 7/2005 | Schroeder et al. | .............. | 73/116 |
| 2007/0152656 A1 * | 7/2007 | McCarrick et al. | ........... | 324/173 |
| 2009/0195878 A1 * | 8/2009 | Kurosawa | ..................... | 359/557 |

FOREIGN PATENT DOCUMENTS

JP     5189849 B2 *  4/2013
SU     1368830 A  *  1/1988

OTHER PUBLICATIONS

Abstract, SU 1368830 A, Jan. 23, 1988.*
English Translation of Description of SU 1368830 A, Jan. 23, 1988.*
Antonelli et al., Displacement Measurement, Linear and Angular, 1999.*
JP 2008-187887 A, Partial Machine Translation of JP 2008-187887 A, Aug. 2008.*

* cited by examiner

*Primary Examiner* — Bot Ledynh

(74) *Attorney, Agent, or Firm* — Mark S. Cohen; Pearl Cohen Zedek Latzer Baratz LLP

(57) ABSTRACT

A sensor includes a magnetic piece with a magnetic array, a conductive coil and ferromagnetic object. The magnetic array provides a spatially modulated magnetic field that is concentrated in the near-field. A processor calculates the ferromagnetic object's speed based on voltage induced in the conductive coil. The ferromagnetic object's movement through the magnetic field causes a change in the magnetic flux, and the rate of change is proportional to the induced voltage.

15 Claims, 4 Drawing Sheets

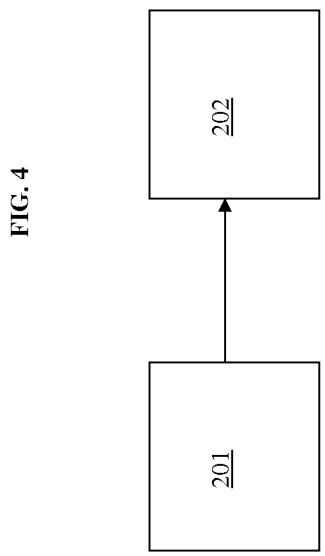

VARIABLE RELUCTANCE SENSOR USING SPATIALLY MODULATED MAGNETIC FIELDS

FIELD OF THE PRESENT INVENTION

The present invention is related to variable reluctance sensors utilizing spatially modulated magnetic fields and other components, and to detecting or metering movement of parts using such sensors.

BACKGROUND

Variable reluctance sensors (VRS) are able to measure the movement or speed of a metal or ferromagnetic object, such as one having teeth or ridges along the object's edge. The movement of the object or object's edges within a magnetic field causes a change in the magnetic flux, inducing a voltage in a conductive coil, which is processed by the sensor. The resulting voltage is proportional to the rate of change in magnetic flux, and speed or position of the object or part of the object may be easily calculated from this voltage measurement. VRS have many applications in automobile control systems, such as measuring wheel speed for anti-lock brakes and wheel bearings and measuring engine revolutions per minute (RPM). Additionally, VRSs may have applications in industrial settings where measuring motor speed or a component speed of rotation is paramount.

A typical VRS may include a permanent magnet with a ferrous pole piece attached to the permanent magnet, while a conductive coil circumnavigates or is wrapped around the ferrous pole piece. The pole piece directs the magnetic field towards a metal rotating gear or other toothed circular component that is ferromagnetic. As the gear's teeth move through the magnetic field, the resulting oscillation in magnetic flux induces a voltage in the conductive coil wrapped around the pole piece. The voltage may be a function of the number of loops the coil makes around the pole piece multiplied by the rate of change of magnetic flux and/or other parameters. The voltage may be measured by a processor connected to the coil, and the processor can calculate the velocity or angular velocity of the gear or other component based on the frequency of the voltage and the known length between gear teeth. VRS are generally low-cost measurement devices, but may be limited from taking accurate measurement of objects moving at slow speeds. This is because the strength of the voltage signal induced depends on the rate of change in the magnetic field, and a lower rate of change (indicating slower speed) translates into a smaller voltage signal.

With VRSs using conventional permanent magnets, significant magnetism will emanate into the far-field, interfering with part of the magnetic field directed towards the gear and thus also interfering with the voltage signal output. The ferrous pole piece orients the magnetic field density closer towards the gear. VRS equipped with a conventional magnet may also require a magnet with strong magnetic force to increase the density of the magnetic field directed towards the gear. Strong magnets may adversely impact other metallic objects nearby, such as credit cards, pacemakers, or other machine parts.

SUMMARY

A sensor includes a magnetic array, a conductive coil and ferromagnetic object. The magnetic array provides a magnetic field that is concentrated in the near-field. A processor calculates the ferromagnetic object's speed based on voltage induced in the conductive coil. The ferromagnetic object's movement through the magnetic field causes a change in the magnetic flux, and the rate of change is proportional to the induced voltage.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 is a flowchart of a sensing method, according to embodiments of the present invention.

Figure 1:
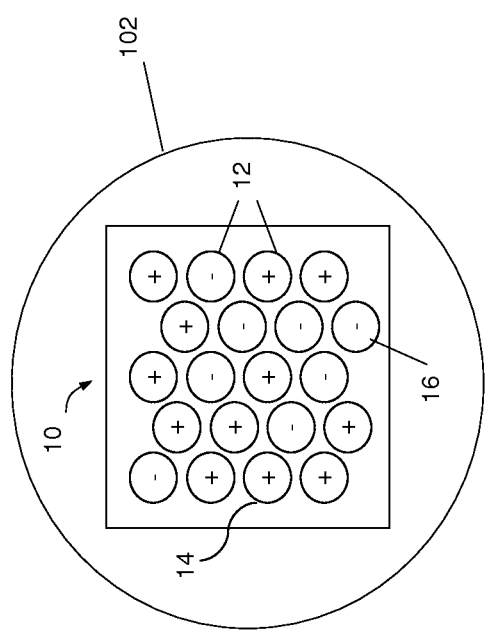
FIG. 1 is a diagram of a magnetic array used in a sensor, according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

According to embodiments of the present invention, a sensor may generate a magnetic field with a magnetic array and measure the speed of a ferromagnetic object passing through the magnetic field. A magnetic field may be represented by a mathematical representation, most commonly a vector field, that illustrates the magnitude and direction of magnetic forces through space. The speed of a ferromagnetic object may be measured when voltage is induced in a conductive coil by the change in magnetic flux passing through the coil. Magnetic flux is the amount of magnetic field passing through a surface. Voltage is a function of the number of loops in the coil multiplied by the rate of change in magnetic flux. The ferromagnetic object may include a regular pattern of ridges along its edge, such as a gear, for example (other objects, such as valves, wheels, brakes, doors, levers, etc. may be used). Magnetic flux may change based on the distance between two magnetic objects and their orientation. A ferromagnetic object, such as a gear, that has ridges moving through the magnetic field of the magnetic array would cause the distance between the magnetic array and the object (or the distance between the nearest portion of the object, such as gears and troughs) to fluctuate at a regular rate. A ferromagnetic object may, in some embodiments, be any rotating object or component. A processor, circuit or other device coupled to the coil may thus be able to calculate the object's speed or rotational rate based on the frequency of the oscillating induced voltage, the radius of the gear, and the distance between the ridges or the number of teeth.

A VRS utilizing weaker magnets than are used in the prior art, yet having a stronger, directed near-field density may be capable of measuring slower speeds than can be measured with prior art devices, and may reduce the device's size and manufacturing cost. Other or different benefits may be achieved.

Magnetic fields may, for example, be generated using spatially modulated magnetic field based devices, electromagnets, permanent magnets, ferromagnetic metals, or other components or devices. A magnetic field may be spatially modulated, in that multiple adjacent magnetic fields (positive or negative) from an arrangement or array of magnetic sources create a close, continuous field of different magnetic polarizations and intensities. Spatially modulated magnetic fields may, for example, be created from an array of magnetic or electric field emission sources or magnetized regions in a material (e.g., a ferromagnetic metal). A magnet may, for example, be a material or an object that emits or produces a magnetic field, which may be a vector field including a direction and a magnitude (e.g., an intensity or strength). A material (e.g., a ferromagnetic material, metal, or other type of material), object, or regions of a material or object may, for example, be positively or negatively magnetized. Spatially modulated magnetic fields may, for example, include a unique arrangement, combination or array of positively and negatively magnetized fields in a material. Such an array may be arranged horizontally on a flat object, flat portion of an object, or a plane. Each of multiple magnetized regions (e.g., magnetic regions, maxels, or other regions) may, for example, be a positively or negatively polarized magnetic field emission source of a pre-determined intensity. A magnetic region may be a region of varying size, surface area (e.g., 1 millimeter (mm) or greater in diameter), or volume. Multiple positive or negative magnetically charged regions may be arranged in an array or pattern on a material. An array or pattern of magnetized regions may, for example, create a unique magnetic pattern, fingerprint or signature. The array of magnetized regions may, for example, be pre-selected, programmed, or determined to have desirable properties (e.g., with other materials or objects with an array of magnetic regions or other magnetic materials).

In some embodiments, a magnitude of magnetic force between surfaces or objects including complimentary magnetic arrays may be greater than between typical magnetic surfaces or objects. A magnetic array may, for example, generate higher near-field magnetic flux than a typical magnet due to the fact that positively magnetized regions (e.g., positive poles) are located next to or in close proximity to negatively magnetized regions (e.g., negative poles). The close proximity of positively charged regions and negative charged regions may result in reduced far-field magnetic flux and increased near-field magnetic flux because a shortest path or path of least resistance between oppositely polarized magnetized poles may be reduced. As a result of greater near-field magnetic flux, magnetic force (e.g., attractive or repulsive magnetic force) between one magnetic array and another ferromagnetic object, or between two complementary magnetic arrays, may be increased. Reduced far-field magnetic flux may, for example, reduce magnetic attractive or repulsive forces between a magnetic array and metal objects in the vicinity of the magnetic array. Thus the concentration of magnetic flux in the near-field may allow a sensor to use less magnetic material or strength to measure the speed of a ferromagnetic object in the magnetic array's near-field, and less magnetic flux is leaked into the far-field.

In one embodiment, a sensor may include a magnetic part or piece including a magnetic array that generates a spatially modulated magnetic field. The magnetic piece may be composed of any ferromagnetic material such as iron, nickel, cobalt, or alloys. The magnetic array may be composed of any configuration, arrangement, or grouping of positively and negatively magnetized regions. The magnetic array may be formed on the magnetic piece, through arrangement of different magnetic materials, or selectively heating adjacent locations on the magnetic piece by laser, for example. Other methods may also be used. The magnetic array may, for example, include any configuration, arrangement, or grouping of adjacent positively and negatively magnetized regions. The magnetic field may, for example, include adjacent positively magnetized regions and adjacent negatively magnetized regions. The magnetic array may, for example, be configured in such a way that generates a higher near-field magnetic flux, or, in another example, direct the magnetic field towards a ferromagnetic object. In a preferred embodiment, from the perspective of looking down the z-axis, perpendicular to the face of the magnetic array, positively magnetized regions may be concentrated in the center, and negatively magnetized regions may surround the concentration of positively magnetized regions. The negatively magnetized regions surrounding the positively magnetized regions may provide a shortest path for magnetic field lines that may otherwise emanate into the far-field (e.g., beyond a threshold distance from the magnet). The shortest path effect would occur in any magnetic array configuration of positively and negatively magnetized regions. In other embodiments, the positively magnetized regions are arranged in equal or other concentrations with negatively magnetized regions, or arranged in a grid, staggered grid, predetermined pattern (e.g., a spiral or other pattern), random pattern, or any other spatial arrangement.

A sensor may include at least one magnetic component (e.g., a magnet material), forming, for example, a magnetic array. A magnetic component may, for example, be an electromagnet, permanent magnet, ferromagnetic metal, magnetic material, a metal, or other components or devices. A magnet may, for example, be a material or object that emits, generates, or produces a magnetic field. A magnetic field may be a vector field including a direction and a magnitude (e.g., an intensity or strength). Magnetic field vectors or field lines may be emitted from a magnetic pole (e.g., magnetic dipoles). Regions of a material or object may be or may include magnetic moments. Magnetic moments may, for example, be positively and/or negatively magnetized regions (e.g., emitting magnetic fields) of varying magnitude.

FIG. 1 is a diagram of a magnetic array according to embodiments of the present invention. Referring to FIG. 1, in some embodiments, a magnetic array 10 made of magnetic materials or components may generate a spatially modulated magnetic field. Spatially modulated magnetic fields may, for example, be generated by an array 10 of magnetic or electric field emission sources or magnetized regions 12 in a material (e.g., a ferromagnetic metal). A magnetic array 10 may, for example, include an arrangement and/or combination of magnetized regions 12 (e.g., maxels, magnetized areas, magnetic dipole regions, or other regions). Magnetized regions 12 may include positively magnetized regions 14, negatively magnetized regions 16, or other types of magnetized regions. Each of multiple magnetized regions 12 may, for example, be a positively polarized magnetic field emission source 14 or negatively polarized magnetic field emission source 16 of pre-determined magnitude (e.g., magnitude, strength, or intensity of magnetic field). A magnetic region 12 may be a region of any suitable size, surface area (e.g., 1 millimeter (mm) or greater in diameter, or other dimensions), shape, or volume. Multiple positively magnetized regions 14 and negatively magnetized regions 16 may be arranged in an array or pattern on a material (e.g., generating a spatially modulated magnetic field). Positively magnetized regions 14 and negatively magnetized regions 16 may, for example, be arranged in a grid, staggered grid, predetermined pattern (e.g., a spiral or other pattern), random pattern, or any other spatial arrangement. A magnetic array 10 may, for example, generate a unique magnetic field (e.g., a magnetic fingerprint or signature).

Spatially modulated magnetic field generated by magnetic arrays 10 on two or more materials or objects may be defined or pre-determined such that the two materials may complement one another. Spatially modulated magnetic fields generated by magnetic arrays 10 on two or more materials may, for example, complement one another by generating an attractive, repulsive, or neutral magnetic force between the two materials. The strength or magnitude of the magnetic force between two magnetic arrays 10 may be a function of a distance between two materials and/or other parameters. The strength or magnitude of the magnetic force between a magnetic array 10 generating a spatially modulated magnetic field and another ferromagnetic material may also be a function of a distance between the two materials and/or other parameters.

FIG. 2 illustrates that a sensor may include a conductive coil 102. The conductive coil 102 may be composed of any conductive material that contains moveable electric charges. Coil 102 may include, for example, windings, loops or turns of wire such as insulated wire, or other structures. When a voltage is applied to the coil 102, the electric charges that move through the coil create an electric current. Conductive material used may include any metal such as copper, silver, aluminum or similar material. Conductive material may also be an alloyed combination of any such metal. In one embodiment, the coil 102 may be disposed anywhere between the magnetic array 10 and a ferromagnetic object 101, such that, for example, the coil 102 is fully or partially between the magnetic array 10 and the ferromagnetic object 101. Coil 102 may be disposed partially between magnetic array 10 and ferromagnetic object 101 such that part of coil 102 is not between magnetic array 10 and ferromagnetic object 101; for example coil 102 may be partially wrapped around object or piece 5, and may partially extend into a space beyond piece 5 towards ferromagnetic object 101. Other arrangements are possible. The spatially modulated magnetic field generated by the magnetic array 10 may radiate through the coil's 102 loops. Since magnetic array 10 contains a grouping of adjacent magnetic regions 12 that are positively magnetized regions 14 or negatively magnetized regions 16, there may be less leakage of magnetic flux into the far-field 109 and less demagnetization that may otherwise occur in non-arrayed magnets. The magnetic field lines from the positively magnetized regions 14 may take a shortest path to the negatively magnetized regions 16, and create a higher concentration of magnetic flux within the coil 102, in the near-field 110 of the magnetic array 10.

In one embodiment, the coil 102 may be partially wrapped around the magnetic array 10 and extend beyond the magnetic array 10 so that the coil is also partially between the magnetic array 10 and the ferromagnetic object 101. In another embodiment, the coil 102 may be fully or partially looped around a pole piece 103 that further directs the magnetic field towards a ferromagnetic object 101. Other configurations may be used.

Figure 2B:
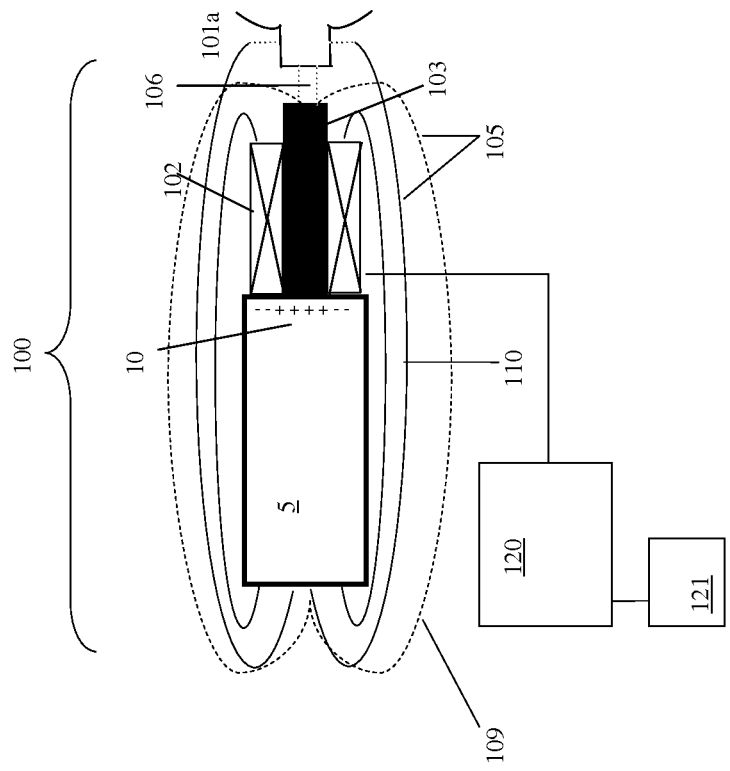
FIG. 2 is a diagram of a sensor at two moments of measurement, according to embodiments of the present invention.
Figure 2A:
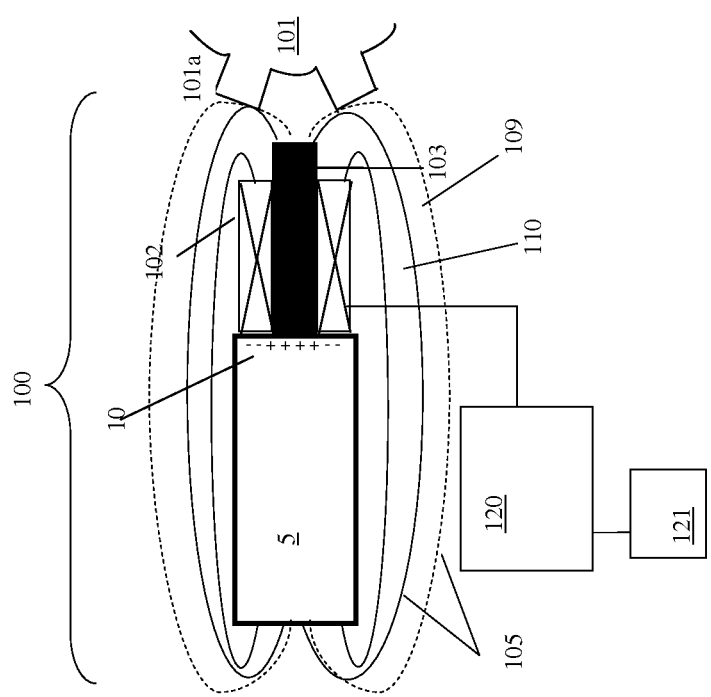

FIGS. 2A and 2B are diagrams of a sensor at two moments of measurement, according to embodiments of the present invention. The sensor 100 may include a magnetic object or piece 5 including a magnetic array 10, a ferromagnetic object 101, and a conductive coil 102 disposed fully or partially between the magnetic array and the ferromagnetic object 101. Magnetic array 10 may be embodied or formed in the material of magnetic piece 5. The sensor 100 may include a pole piece 103 that directs the magnetic field closer to the ferromagnetic object 101. The conductive coil 102 may be looped around, wrapped around, or may otherwise surround the pole piece 103. The sensor 100 may include a processor 120, controller, or other circuit, that measures the voltage induced in the conductive coil 102 and calculates the speed of the ferromagnetic object 101. The processor 120 may execute code or instructions, for example, stored in a memory 121. The magnetic array 10 may include an arrangement of magnetic regions 12 that are variously positively or negatively charged. The magnetic regions 12 create a spatially modulated magnetic field from a group of magnetic components. A magnetic component may, for example, be an electromagnet, permanent magnet, ferromagnetic metal, magnetic material, a metal, or other components or devices. A magnet may, for example, be a material or object that emits, generates, or produces a magnetic field. A magnetic field may be a vector field including a direction and a magnitude (e.g., an intensity or strength). Magnetic field vectors or field lines may be emitted from a magnetic pole (e.g., magnetic dipoles).

The magnetic array 10 may generate spatially modulated magnetic field lines 105 that move through the loops of the conductive coil 102 and through the device 100. The ferromagnetic object 101 may pass through the spatially modulated magnetic field lines 105. The ferromagnetic object 101 may be composed of any ferromagnetic material that affects the spatially modulated magnetic field 105, such as iron, nickel, cobalt or their alloys, for example. Ferromagnetic object 101 may have extensions, ridges, or teeth 101a for example on its edge. Other ferromagnetic objects 101 of different shapes or types (e.g., wheels, valves, wheels, brakes, doors, etc.) may be used. In the case that ferromagnetic object 101 is a gear, it may move by being rotated, and the object moving may be considered to be the object 101 or a tooth or ridge 101a. Spatially modulated magnetic field lines 105 may vary, for example, with the distance between ferromagnetic object 101 and magnetic array 10. As ferromagnetic object 101 moves through magnetic field 105, the magnetic field may change, as between FIGS. 2A and 2B. As shown in FIG. 2B, when the position of ferromagnetic object 101 is such that a ridge or tooth 101a is nearest to the magnetic array 10, the magnetic field is strongest 106 and most directed towards the ferromagnetic object 101. In FIG. 2A, when the ridge or teeth 101a of the ferromagnetic object 101 moves further away from the magnetic array 10, the magnetic field 105 may be slightly less concentrated. The changes in magnetic flux as the ferromagnetic object 101 continuously or discretely moves through the magnetic field 105, illustrated in the difference between FIGS. 2A and 2B, may induce a voltage in the conductive coil 102. The conductive coil 102 may be electrically coupled with a processor 120 or other circuit that measures the voltage on the coil 102. The voltage may be proportional to the rate of change of the magnetic flux, and the processor 120 may calculate the speed of the ferromagnetic material moving through the magnetic field 105 based on this proportional relationship. Processor 120 may be, for example, a central processing unit (CPU), a chip, or any suitable computing or computational device. Processor 120 or controller may include multiple processors, and may include general-purpose processors and/or dedicated processors such as graphics processing chips. Processor or controller 120 may execute code or instructions, for example, stored in a memory 121 or another device.

In one embodiment, a pole piece 103 may be disposed on the magnetic array 10, with one end on the magnetic array 10 and the other end closer to the ferromagnetic object 101. The pole piece 103 may direct the magnetic field 105 even closer to the ferromagnetic object 101 and may strengthen the magnetic field and/or magnetic moment of sensor 100. The pole piece 103 may also be ferromagnetic material such as iron, nickel, cobalt or their alloys, for example. The conductive coil 102 may be looped partially or fully around the pole piece 103, while the magnetic array's 10 magnetic field 105 passes through the coil 102.

Figure 3:
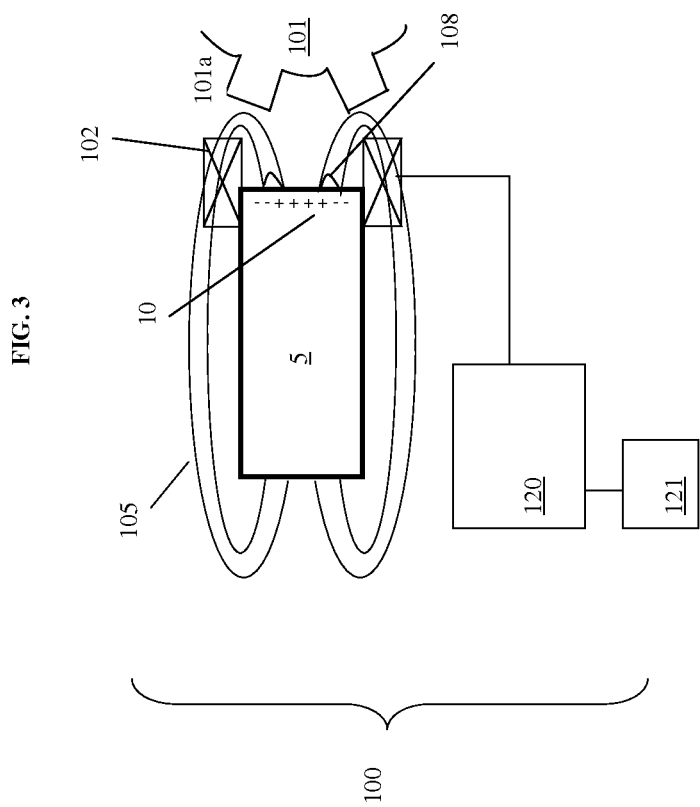
FIG. 3 is a diagram of a sensor, according to embodiments of the present invention.

In another embodiment, shown in FIG. 3, a sensor 100 may include a magnetic piece 5 with a magnetic array 10 generating spatially modulated magnetic field lines 105, a conductive coil 102 partially attached to the magnetic array 10, and a processor 120 or other circuit that is electrically coupled to the conductive coil 102. The near-field concentration 110 of magnetic field lines may pass through the conductive coil 102 without the need for a pole piece. Due to the properties of the spatially modulated magnetic field generated by the magnetic array 10, less magnetic flux is leaked into the far-field 109 and a pole piece is not required to direct the magnetic field toward a moving ferromagnetic object 101. The magnetic field lines may take the shortest path 108 through the device and concentrate the magnetic field 105 closer to the device 100 and within the coil 102. An embodiment of the invention may generate a spatially modulated magnetic field that is concentrated in the near-field 110, with fewer field lines leaking into the far-field 109. Since this may be accomplished by the magnetic array alone, the pole piece may be eliminated from the sensor, resulting in cheaper manufacturing cost and a more compact sensor. Some embodiments of the present invention, however, may utilize a pole piece 103.

FIG. 4 is a flowchart of a sensing method, according to embodiments of the present invention. Embodiments of the invention may use a magnetic array to measure the speed or rotational rate of an object. In operation 201 a ferromagnetic object may move through a magnetic array's magnetic field (e.g., an array as depicted in FIGS. 1-3, although other arrays may be used), causing a change in the magnetic field. For example, a gear may rotate, or a valve, motor part or door may move. In operation 202 voltage induced in a conductive coil associated with the magnetic array by the changing magnetic field may be measured, e.g., by a controller or circuit attached to the coil. The speed, or rotational speed or rate, of the ferromagnetic object may thereafter be calculated (e.g., by a processor) based on, for example, the frequency of this voltage or signal and the known length between the ferromagnetic object's ridges or teeth, or voltage frequency and the number of ridges passing through the magnetic field in one revolution. Other factors such as the diameter of the object may be used. Other operations or series of operations may be used.

Embodiments of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A variable reluctance sensor comprising:
one solid, magnetizable body having one surface facing a rotatable, ridged ferromagnetic object,
an array of magnets permanently magnetized into the solid, magnetizable body,
wherein each of the magnets of the magnetic array has a circular surface area disposed in the surface facing the ferromagnetic object, each of the circular surface areas magnetically distinct from surrounding area of the surface facing the ferromagnetic object,
wherein each of the magnets of the magnetic array is oriented such that magnetic flux between a north pole and a south pole of each of the respective magnets is substantially perpendicular to the surface facing the ferromagnetic object; and
a conductive coil wrapped around at least a portion of the magnetizable body such that passage of the ridges of the ferromagnetic object through a magnetic field emanating from the array of magnets induces a voltage in the coil.

2. The variable reluctance sensor of claim 1, further comprising a processor configured to calculate speed of the ferromagnetic object based on the voltage.

3. The variable reluctance sensor of claim 1, wherein at least two of the circular surface areas have different sized surface areas.

4. The variable reluctance sensor of claim 3, wherein two of the circular surface areas have have opposite magnetic polarities.

5. A method of constructing a variable reluctance sensor comprising:
permanently magnetizing an array of magnets into one solid, magnetizable body,
wherein each of the magnets of the array of magnets has a circular surface area magnetically distinct from surrounding area of surface of the solid, magnetizable body, the surface facing a rotatable, ridged ferromagnetic object, wherein each of the magnets oriented such that magnetic flux between a north pole and a south pole of each of the respective magnets is substantially perpendicular to the surface facing the ferromagnetic object; and wrapping at least a portion of the magnetizable body with a conductive coil such that the ridges of the ferromagnetic object passing through a magnetic field emanating from the the array of magnets induces a voltage in the coil.

6. The method of claim 5, wherein two of the circular surface areas have opposite magnetic polarities.

7. The method of claim 5, further comprising providing a processor configured to calculate speed of the ferromagnetic object based on the voltage.

8. A method for measuring angular speed of a ferromagnetic object comprising:

generating a magnetic field from an array of magnets permanently magnetized into one solid, magnetizable body, wherein each of the magnets of the magnetic array has a circular surface area magnetically distinct from surrounding area of a surface of the solid, magnetizable body, the surface of the solid, magnetizable body facing a rotatable, ridged ferromagnetic object, wherein each of the magnets of the magnetic array is oriented such that magnetic flux between a north pole and a south pole of each of the respective magnets is substantially perpendicular to the surface facing the ferromagnetic object;

using a processor to calculate angular speed of the ferromagnetic object based on voltage induced in the coil responsively to passage of the ridges of of the ferromagnetic object through the magnetic field.

9. The variable reluctance sensor of claim 4, wherein at least two of the magnets of the array of magnets have differing magnetic intensities.

10. The method of claim 6, wherein at least two of the magnets of the array of magnets have differing magnetic intensities.

11. The method of claim 8, wherein at least two of the magnets of the array of magnets have differing magnetic intensities.

12. The method of claim 8, wherein two of the circular surface areas have different sized surface areas.

13. The method of claim 12, wherein two of the circular surface areas have opposite polarities.

14. The method of claim 8, wherein two of the circular surface have different sized surface areas.

15. The method of claim 8, wherein two of the circular surface areas have opposite polarities.

\* \* \* \* \*